July 28, 1942.   H. R. ANSEL   2,290,903
DOMESTIC HOT WATER TANK
Filed May 20, 1940   2 Sheets-Sheet 1
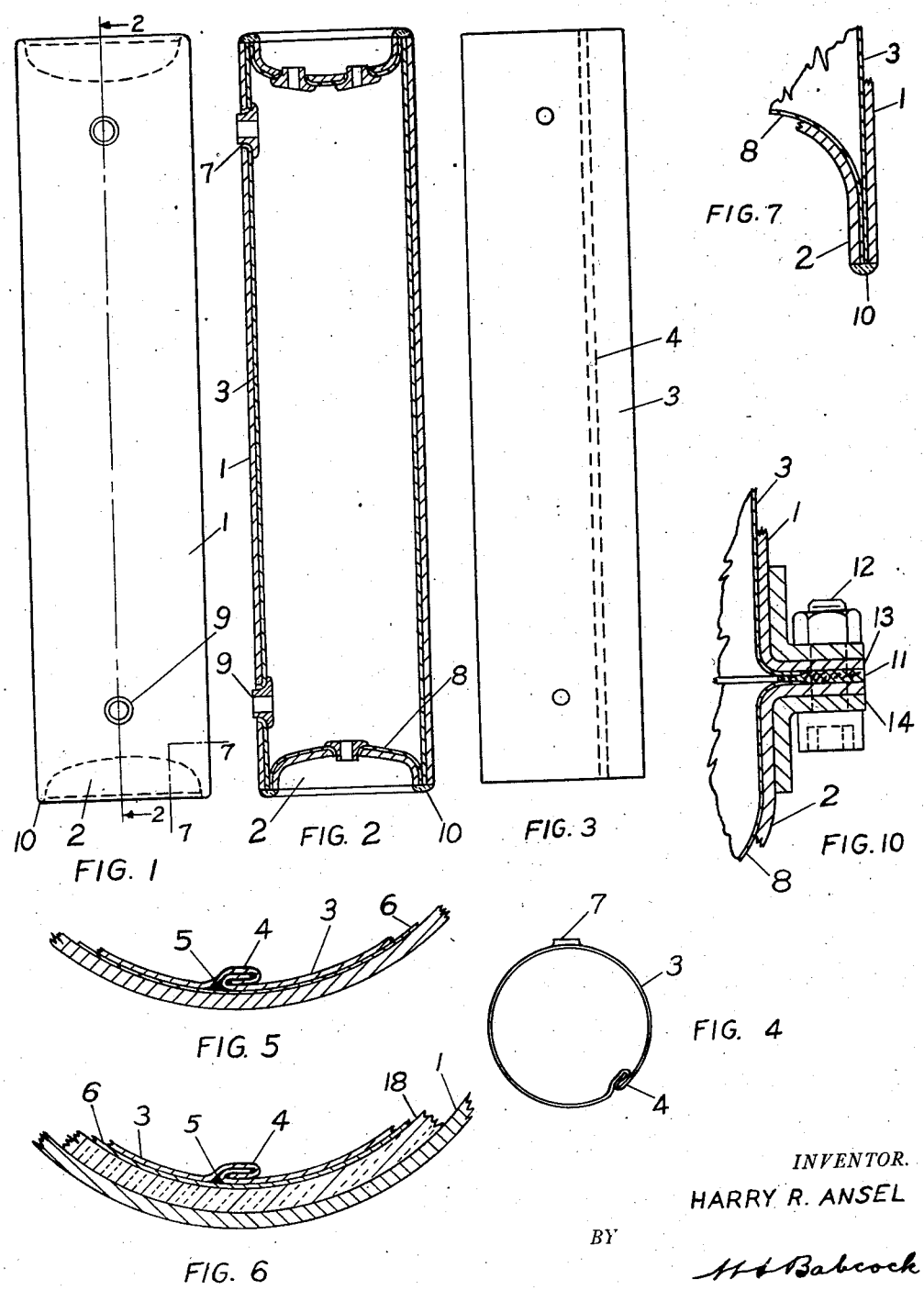
INVENTOR.
HARRY R. ANSEL
BY
H. L. Babcock
ATTORNEY.

July 28, 1942. H. R. ANSEL 2,290,903
DOMESTIC HOT WATER TANK
Filed May 20, 1940 2 Sheets-Sheet 2
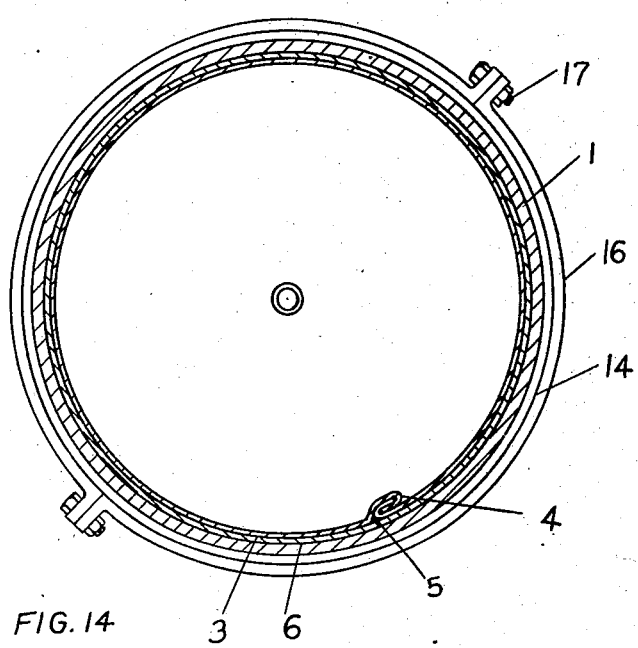
FIG. 14
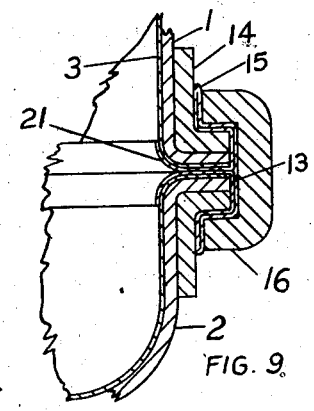
FIG. 9.
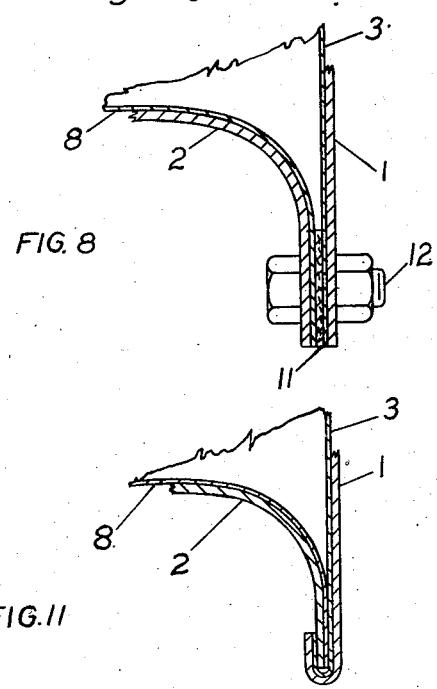
FIG. 8
FIG. 11
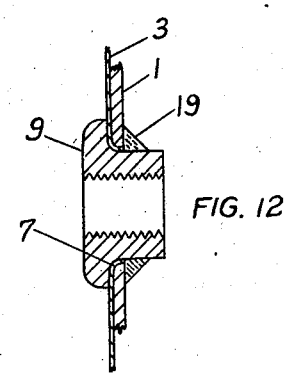
FIG. 12
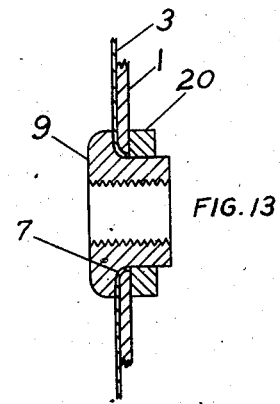
FIG. 13
INVENTOR.
HARRY R. ANSEL
BY
*M. S. Babcock*
ATTORNEY.

Patented July 28, 1942

2,290,903

UNITED STATES PATENT OFFICE 2,290,903

DOMESTIC HOT WATER TANK

Harry R. Ansel, Cleveland, Ohio

Application May 20, 1940, Serial No. 336,174

6 Claims. (Cl. 220—67)

The invention to be hereinafter described relates to domestic hot water tanks.

The most generally used tank of this type is the galvanized tank. Its method of manufacture and its construction are well known and need not be detailed here. Galvanizing, of course, is for the purpose of protecting the steel body or shell against corrosion. Water for domestic purposes is seldom even approximately pure. Even approximately pure water contains considerable free oxygen and/or air. Among the more common and more widely distributed impurities in water for domestic use are alkalies, including lime. Hard water, usually due to lime, is very common. Most cities treat their water with one or another rectifying chemical, chlorine being one of the most widely used. So, water for domestic use, usually contains one or more chemicals either found naturally in the water or added for rectifying purposes. It is common knowledge that galvanizing, as commercially practiced, is imperfect and that there are, frequently, small spots that are missed, or from which, sometimes, the galvanization is torn or scraped. Every such unprotected spot is subject to attack by those impurities in the water. Corrosion is quickly started. The continual circulation of the water in the tank constantly renews the attacks. Soon there are leaks and the tank is ready to be discarded. And, of course, chemical action producing corrosion increases with increase in temperature. Relatively high temperatures are necessary for heating water in these tanks, as will be understood.

Where expense or cost is not an important consideration, tanks of copper are, in many cases usable. They cost, relatively, much more than galvanized tanks. They do protect against many of the impurities in the water passing through them. However, there are frequent cases in which copper is not a sufficient protection, as shown by green coloring of the water issuing from some copper tanks.

Enamelling has been tried. One difficulty is having the correct coefficient of expansion of enamel relatively to that of the steel to be coated, to prevent cracking of the enamel, due to expansion and contraction in varying temperatures during operation. In assembling, considerable stresses are involved and a very slight bending of the coated metal breaks and chips off the enamel. Enamel is brittle, of course, and a blow destroys it. In the case of a cylinder or similar container, a blow on one surface of the wall sufficient to damage the enamel on that side or to indent the cylinder, will, frequently, destroy the enamel on the opposite side at the same time. Enameling, adds to the cost, compared to galvanizing.

Monel metal has been used. While it is sufficiently corrosion resistant, the cost is prohibitive for ordinary uses.

There are, on the market, compound or composite sheets of metal, one surface being a layer of rust proof steel or the like. In the manufacture of such sheets, there is no way of preventing thin places, gaps or holes through or in the rust proof layer. The thickness of the rust proof layer is not uniform. There may be many instances in which there are bare patches or areas in which the rust proof layer runs out, or over which it does not extend. As far as I am informed, these composite or laminated sheets have not been used in the manufacture of tanks of this type. The cost would be greater than that of galvanized tanks. In every spot or area where the rust proof layer failed to completely cover the supporting metal there would be corrosion and leakage just as with the galvanized tanks.

The main objects of the present invention are to avoid the above and other disadvantages and draw-backs and provide a strong, durable, efficient, compact, corrosion resistant tank, capable of large quantity production from readily obtainable materials and retailing at a low figure.

Other objects will appear from the following specifications and claims.

In order to more clearly disclose the construction, operation and use of the invention, reference should be had to the accompanying drawings forming part of this application. Throughout the several figures of the drawings, like reference characters designate the same parts in the different views.

In the drawings:

Fig. 1 is a side elevation of the invention;

Fig. 2 is a cross section on line 2—2 of Fig. 1, looking in the direction of the arrows;

Fig. 3 is a side elevation of the cylindrical liner, ready for insertion;

Fig. 4 is a bottom plan view of Fig. 3, as it is after complete assembly, the thickness of the liner being greatly exaggerated;

Fig. 5 is a greatly enlarged fragmentary cross section, showing tank, mastic and liner, and one form of the liner joint;

Fig. 6 is a view similar to Fig. 5, showing the insulation;

Figs. 7, 8, 9, 10 and 11 are fragmentary cross sections, enlarged, through the junction of side and end wall at the approximate point indicated by the line 7—7 on Fig. 1, and looking in the direction of the arrows, each view indicating a different construction of joint;

Fig. 12 is an enlarged fragmentary cross section through a spud connection;

Fig. 13 is a like view through a preferred form or type of spud connection; and, Fig. 14 is a cross section on line 14—14 of Fig. 9, looking in the direction of the arrows.

For clearness, the thickness of the liner is greatly exaggerated and out of proportion in all views. Actually, it is very thin, about the thickness of a sheet of paper, in common parlance. Its thickness may be measured in thousandths of an inch. So, if shown in proper proportion, an extremely fine single line would represent the total thickness. The same is true of the layer of mastic between liner and tank wall or between liner and heat insulator.

It will be well understood that the body of the tank may be assembled in any one of a number of ways several of which have been illustrated in the drawings. The preferred way, because of its simplicity, efficiency and low cost, is that shown in Figs. 1, 2 and 7, the details of which will be given hereinafter.

The first step in the present invention is to make the tank body. This is the pressure resisting member or element which meets all physical strains and bears the bulk of the wear and tear of use. Preferably, its cylindrical or side wall is made from a single sheet of steel rolled into tubular form with edges engaged. It is then electrically welded along those edges, producing an open ended cylinder. Preferably, before rolling the sheet to form the cylinder, the usual holes or openings are made through it for later insertion of spuds or pipe end connections or couplings of usual and well known type. These spuds, however, are not put in place until after the liner, hereinafter described, is properly positioned. To complete the outer body or tank wall, in the form of Figs. 1, 2 and 7, dished heads are formed, in well known manner, from similar steel sheets or sheet steel. They are proportioned to fit snugly within the opposite ends of the cylinder, with due allowance for the liner which will extend between them and the inner wall of the cylinder. These heads are, also, provided with the usual opening to receive the usual spuds or pipe connections or couplings. This shell, comprising body and ends, provides the required strength for support. It meets and amply resists all strains and stresses due to weight of water, pressure generated by heat or otherwise and all mechanical stresses. Briefly, this shell provides all necessary strength for the tank. However, it is totally lacking in corrosion resistance. That is provided by a simple, readily placed and readily removed liner, as will later appear.

Referring to the drawings in detail and particularly to Figs. 1, 2, and 7, 1 is the cylindrical body or wall of metal such as sheet steel and made in any well known manner as above indicated, and 2 is a dished end or head. It may be arranged with the convex surface inwardly of the assembled tank, either at one end or at both ends, as may be desired. In the preferred form, Figs. 1, 2 and 7, the convex surface is directed inwardly from both ends. In Figs. 9 and 10 it is directed oppositely. When assembled, as will later appear, this cylinder and heads will provide ample strength for all normal requirements of such a tank.

The liner of corrosion resistant material may be of rustless or non-rusting steel, zinc or other corrosion resisting metal, rolled into tubular form to fit within the body 1. Its thickness may be measured in thousandths of an inch. Its sole purpose and function is to shield or protect the inner wall of 1 against corrosion or attack by destructive elements in the water. It intervenes between 1 and the contents of 1, so that the contents never contact 1. It is not called upon to resist any appreciable physical forces of any kind. Consequently, it may be made so thin as to be very light weight and flexible, as well as cheap. Such flexibility has two particular advantages. First, it is a decided advantage in assembling. Second, it is a great advantage in automatically accommmodating itself to rough usage of the body 1. Should the body be struck such a blow as would indent it, for instance, the liner will simply yield to snugly fit the new contour. There will be no break nor rupture. The complete protection will remain. This liner is not destroyed, as is enamel or some other protective device, by rough treatment of the tank wall. Whatever metal is used, the longitudinal edges may be connected in well known manner by the usual lock joint 4, such as shown in Fig. 5, for instance. Asphaltic or other similar joint sealing medium 5 may be used in well known manner. Or, when steel or other weldable metal is used for the liner, the edges may be electrically welded in well known manner.

Preferably, the liner cylinder thus made is very slightly oversize relative to the body which is to receive it. Its exterior diameter is very slightly greater than the interior diameter of the body which it is to line. It is, therefore, under very slight compression when in place, making a close, snug fit with the body. Before assembling, either or both the body 1 and exterior liner 3 may be painted or otherwise coated or covered with a mastic 6 such as an oil, graphite or the like to make a complete seal between 1 and 3. Purely for illustration, this layer is shown greatly exaggerated in thickness in the drawings. Incidentally, this substance acts as a lubricant and facilitates the assembling of 1 and 3, as will be readily understood.

At this point, it is not out of place to call attention to the well known fact, both for enamelling and for galvanizing, that the surface to be covered must be thoroughly and completely cleaned, with special reference to any seams or joints. Where ever any small spot is not cleaned, the coat will not hold. That requirement and difficulty is completely eliminated by this invention.

Also, enamelling requires a minimum of 1600 degrees F. The result is that there is slight distortion of the metal of the body 1 and ends 2 during enamelling. Consequently, if the heads and body are intended to be connected by bolting, bolt holes drilled before enamelling would not aline after enameling. That, when enameling is the process, requires drilling through enamel after enameling, with very serious damage to the enamel.

And, as is well understood, with enamel adhering integrally to the steel, their different coefficients of expansion produce continuous opposing strains and stresses, tending toward destruction of the bond and resulting separation. Of course, in the present invention there is no such difficulty and no such damage.

Preferably, the liner cylinder, before assembly in body 1 is provided with small openings corresponding with the openings in 1 to receive the usual spuds. These openings are of appreciably less diameter than the openings in 1. With the liner properly positioned and its openings alined concentrically with those through 1, a suitable well known spinning, or rolling tool will be used, in well known manner, to increase the diameter of the liner openings to that of the openings through 1, the displaced metal being turned inwardly of the spud openings or outwardly relatively to the liner cylinder 3, so that, assembled, it extends through the spud opening and lines it from the inside to the outside of the cylinder 1.

After the liner 3 has been extended through the holes in 1, as above, the ends 2 may be inserted. Again, referring more particularly to Figs. 1, 2 and 7, a cap or cup 8 of the same material as 3 is formed in any usual and well known manner, as by pressing, and is then placed on or over the head or end 2, one or both of the contacting surfaces having been previously painted or otherwise coated with 6. It should be stated that the heads and cylinder, with the two layers 3 and 8 of liner between, are proportioned to make a snug fit when assembled. And, of course, each cap 8 is provided with one or more openings corresponding to the openings through the respective heads, the liner material being flanged into and through those openings as it is flanged into and through the openings in 1.

Preferably, before assembly of heads 2 in cylinder 1, spuds 9 of usual and well known construction are seated in all openings through 1 and 2. The inner flanged ends of the spuds engage the liner while the tubular part engages the flange 7. So, as the spud is seated, in well known manner, it clamps the liner flange 7 in protecting operative position against the wall of the opening. These spuds may be permanently seated as by weldings 19, as shown in Fig. 12, or collars 20 may be shrunk on or pressed on, as in Fig. 13, to removably seat them. Or any other suitable and well known means may be used for securing them in place, either permanently or removable, as desired.

When the heads 2 and body 1, provided with their respective linings, have been completed and assembled, they are secured together. The simplest and preferred arrangement is that of electric welding. For this purpose beads 10 are used. They may be rings or circular, approximately semi circular in cross section, and of such diameter as will readily seat on or over the free edges of the respective assembled head and body. The bead is welded on in usual and well known manner, the weld extending upwardly into the metal of the edges of 1 and 2, in well known manner. This makes an integral, strong, solid and inexpensive construction.

Instead of welding, the heads may be moved inwardly beyond the edges of 1 and the projecting portions of 1 rolled inwardly and upwardly around and about the edge of 2 making a U-shaped lock joint, as shown in Fig. 11. This is a very strong and economical construction.

In cases where a zinc liner is used welding, as in Fig. 7, is not practical because the heat of welding volatilizes the zinc at and near the welding area. To meet that difficulty, the construction of Fig. 8 may be used. In that construction, the head and body are assembled with a gasket 11 between and they are connected either by rivets or by bolt and nut assembly 12, in well known manner.

In Figs. 9 and 10 further modifications of assembly are illustrated. In both of these, the body 1 and heads or ends 2 are provided with outwardly directed cooperating coupling flanges 13. To strengthen or stiffen those flanges, rings 14 are provided, spot welded or otherwise suitably rigidly secured to the flanges. Preferably, rings 14 are of angle iron or the like and substantially L-shaped in cross section. In Fig. 10 the coupling is completed by a series of bolts and nuts 12, as in Fig. 8, passed through 13, 14 and an intervening ring washer or gasket 11. In Figs. 9 and 10, cap 8 is, of course, on the concave side of 2 instead of on the convex side and the head 2 extends beyond instead of within the body 1. In Fig. 9 the edges of 3 and 8 are flanged outwardly, in well known manner over the flanges 13 but not far enough to be pierced by the bolts 12 when assembled. These outward or flanged ends are, however, in assembled position, securely clamped between gasket 15 and flanges 13, making a complete tight seal and securely holding the edges of the liner (Fig. 9). In Fig. 9 a particularly desirable and special construction of self-sealing gasket 15 is shown. It is designed to be used with segmental or sectional ring clamps 16 of channel or U-shape in cross section, secured in place by bolt and nut connections 17. In general, it might be said that the connections of Fig. 9 are similar to those of Fig. 10. It will be noticed however that the width of the flanges 13 in Fig. 9 may be considerably reduced relatively to Fig. 10. That is due to the fact that they do not have to provide space for passage of bolts or for seating of cooperating nuts.

The gaskets 15, of any suitable flexible material is first folded upon itself to provide a simple flat two layer ring or part of a ring. Then it is placed on the flange of the liner overlying the flange 13 of head 2 in such position that its free edges extend very slightly inwardly beyond the flange, when assembled. The head 2 is then placed in position to be secured to the body 1. Then the folded, two-layer gasket is folded about and around the flanges 13 and 14 and the ring clamps 16 are slipped in place over the gasket and flanges and drawn tight to holding position by the bolt and nut couplings or connections 17, the assembly being as shown in Figs. 9 (in cross section) and 14 (in plan). Because there are no bolts to pierce the flanges of the liner, they may extend clear to the outer ends of the flanges 13 or as far in that direction as desired. Clamping rings 16 have been shown as semi or half circles. That is the simplest form. Obviously they may be in thirds, quarters or other fractions of a circle. Also, gasket 15 has been represented and referred to as one piece. Clearly, it may, also, be in several pieces. And too, it may be molded to shape in advance, instead of being molded or folded about the flanges at the time of or after assembly.

It will be noticed that, after assembly, the free edges of the gasket are spread or splayed apart forming a V-channel 21 extending completely around the inside of the tank at the junction of tank wall and head. The tip or point of the V extends into the joint while the two branches curve from that tip inwardly of the tank and around the curve of the bend of the tank wall and head, respectively, leading into flanges 13. Because of this inwardly opening V, pressure within the tank forces the gasket tightly against the liner. As the pressure increases, the sealing action of the gasket is automatically increased. Likewise, as will be clear, the full interior pressure is exerted on the gasket 15 along the two narrow annular surfaces which lie between the clamps 16 and the rings 14. As the pressure increases in the tank there is a corresponding increase on the gasket. The sealing effect is, therefore, automatically increased proportionately to tank pressure.

With a tank of this construction, heat insulation may be placed where most effective—in closest possible relation to the heated medium or contents. Heretofore, insulation could not be so placed. It had to be placed on the outer face of the tank wall. In this construction it may be placed within the tank wall, between it and the liner, as at 18. Asbestos sheet or any other well known kind of insulation may be used. Where insulation is used, as above indicated, the mastic layer 6 is between it and the liner 3. Obviously, an additional layer 6 could be used between the tank body 1 and the insulation 18, if desired.

As has been previously stated, normal circulation within the tank continually renews the chemical attacks causing corrosion. Without such circulation, therefore, even with no protection, corrosion would be greatly reduced. Consequently, if we assume, which is highly improbable, that there should be a weak spot in the lock joint of the liner, allowing a very small quantity of water to get through, that small amount would cause practically no corrosion. And since there would be no circulation within that small quantity, corrosion would cease when the effect of the impurities in that small amount had been exhausted. And, of course, even after that small amount had passed the lock joint or other seam, the layer of mastic 6 would still protect the surface 1 to a limited extent.

Thus, liner 3 is, for all practical purposes, a complete and perfect protection against corrosion. It is, obviously, easily removable and replaceable with least possible effort and expense and without any damage to or alteration of the body 1. By its use, the body 1 will last indefinitely. Strains and stresses applied to the body are not, in any degree, transmitted to the liner. On the other hand, all corrosive action is intercepted by the liner and none reaches the body.

The body and liner, while wholly separate, physically, from each other, are wholely dependent upon each other, as will be obvious.

While the joint or seam of body 1 and liner 3 has been referred to as though it were parallel with the longitudinal axis of the finished cylinder, it will be understood that the well known spiral joint may be used. The particular joint is no part of this invention. Any suitable and acceptable joint which will operate efficiently for the purposes of this invention may be used and is intended to be included within this application.

At the ends, the liner seam or joint is reduced to a single thickness by cutting out or notching, in well known manner, to give a uniform and even fit throughout the contact between the liner or cap 8 of the respective head and the liner 3 of the body. And, of course, the same applies to the flanged portions of 3 extending between flanges 13.

Simply as a matter of clearness in the drawings, the mastic layer 6 shown enlarged in Figs. 5, 6 and 14, is omitted from Figs. 2 and 7 to 13, inclusive.

It is thought that the construction, operation and use of the invention will be clear from the preceding detailed description. Many changes may be made in the construction, arrangement and disposition of the various parts of the invention within the scope of the appended claims, without departing from the field of the invention, and it is meant to include all such within this application wherein only one preferred form and several modifications have been shown, purely by way of illustration and with no thought or intention to, in any degree, limit the claims, or this application, by such illustration.

Having thus described my invention, what I claim and desire to protect by Letters Patent is:

1. A hot water tank of the character described comprising a body having an outwardly directed flange, a head having a cooperating flange, a gasket extending continuously between said flanges, around the edges thereof and over the outer faces thereof and a clamp engaging said gasket and binding the same against said flanges with force proportionate to the internal pressure of the tank.

2. A hot water tank of the character described comprising a body having an outwardly directed flange, a head having a cooperating flange, a gasket extending continuously between said flanges, around the edges thereof, over the outer faces thereof, and presenting divergently flared edges circumferentially of said tank adjacent the inner line of contact between head and body operable to sealing position by pressure within said tank, and a clamp engaging said gasket and binding the same against the flanges with force proportionate to the internal pressure of the tank.

3. A hot water tank of the character described comprising a body having an outwardly directed flange, a head having a cooperating flange, a corrosion resistant liner for said body extending between said flanges, a gasket extending continuously between said flanges, over the liner portion therebetween, around the edges of said flanges and over the outer faces thereof, and a clamp engaging said gasket and binding the same against said flanges with force proportionate to the internal pressure of the tank.

4. A hot water tank of the character described comprising a body having an outwardly directed flange, a head having a cooperating flange, corrosion resisting liners for said body and head extending between said flanges, a gasket extending continuously between said flanges, over the liner portions therebetween, around the edges of said flanges and over the outer faces thereof, and a clamp engaging said gasket and binding the same against said flange with force proportionate to the internal pressure of the tank.

5. A hot water tank of the character described comprising a body having an outwardly directed flange, a head having a cooperating flange, a corrosion resistant liner for said body extending between said flanges, a gasket extending continuously between said flanges, over the liner portion therebetween, around the edges of said flanges, over the outer faces thereof, and presenting divergently flared free edges circumferentially of said tank along the junction of head and body, operable to sealing position by pressure within said tank, and a clamp engaging said gasket and binding the same against the flange with force proportionate to the internal pressure of the tank.

6. A hot water tank of the character described comprising a body having an outwardly directed flange, a head having a cooperating flange, corrosion resistant liners for said body and head, said liners extending between the aforesaid flanges, a gasket extending continuously between said liner portions between said flanges, around the edges of said flanges and over the outer faces thereof and presenting divergently flared free edges circumferentially of said tank along the junction of head and body, operable to sealing position by pressure within said tank, and a clamp engaging said gasket and binding the same against the flange with force proportionate to the internal pressure of the tank.

HARRY R. ANSEL.